United States Patent
Winkler et al.

(10) Patent No.: US 11,999,156 B2
(45) Date of Patent: Jun. 4, 2024

(54) CLIMATE CHAMBER WITH THERMALLY INSULATING SANDWICH-STRUCTURED LAMINATE

(71) Applicant: Binder GmbH, Tuttlingen (DE)

(72) Inventors: Hartmut Winkler, Tuttlingen (DE); Nina Seligmann, Deisslingen (DE); Mario Husseck, Villingen-Schwenningen (DE); Jan Moll, Donaueschingen (DE)

(73) Assignee: Binder GmbH, Tuttlingen (DE)

(*) Notice: Subject to any disclaimer, the term of this patent is extended or adjusted under 35 U.S.C. 154(b) by 0 days.

(21) Appl. No.: 18/075,813

(22) Filed: Dec. 6, 2022

(65) Prior Publication Data
US 2023/0100430 A1    Mar. 30, 2023

Related U.S. Application Data

(62) Division of application No. 17/078,995, filed on Oct. 23, 2020, now Pat. No. 11,745,464.

(30) Foreign Application Priority Data

Oct. 25, 2019  (DE) .................. 10 2019 128 829.0

(51) Int. Cl.
  *B32B 5/32*  (2006.01)
  *B01L 7/00*  (2006.01)
  (Continued)

(52) U.S. Cl.
  CPC .................. *B32B 5/32* (2013.01); *B01L 7/00* (2013.01); *B29C 44/06* (2013.01); *B29C 44/18* (2013.01);
  (Continued)

(58) Field of Classification Search
  CPC ............ B29C 44/1214; B29C 44/1219; B29C 44/1228; B29C 44/1233; B29C 44/1326;
  (Continued)

(56) References Cited

U.S. PATENT DOCUMENTS 3,719,303 A * 3/1973 Kronenberger ....... F25D 23/064
                                                                   220/902
6,276,104 B1 * 8/2001 Long, Sr. ................ E04G 11/18
                                                                   52/309.7
(Continued)

FOREIGN PATENT DOCUMENTS

CN       102057237       5/2011
CN       207194766       4/2018
(Continued)

OTHER PUBLICATIONS

Office Action for Chinese Patent Application No. 202011148532.1, The State Intellectual Property Office of People's Republic of China, and translation.
(Continued)

*Primary Examiner* — Stella K Yi
(74) *Attorney, Agent, or Firm* — Akerman LLP; Peter A. Chiabotti

(57) ABSTRACT

A method for the development of a thermally insulating sandwich-structured laminate, such as a sandwich-structured laminate of a housing of a climate chamber for the high temperature range, with an internal wall and an external wall, can include the method steps: providing the internal wall, adhering at least one high temperature stable insulation panel onto the internal wall, positioning the external wall with respect to the internal wall such that between the internal wall and the external wall the at least one high temperature stable insulation panel and a hollow volume are developed. The method can further include filling the hollow volume with a PUR foam for the formation of a second rigid foam layer connecting the at least one high temperature stable insulation panel and the external wall.

8 Claims, 1 Drawing Sheet

(51) Int. Cl.
  *B29C 44/06* (2006.01)
  *B29C 44/18* (2006.01)
  *B32B 7/027* (2019.01)
  *B32B 7/12* (2006.01)
  *B32B 15/04* (2006.01)
  *B32B 15/095* (2006.01)
  *B32B 15/18* (2006.01)

(52) U.S. Cl.
  CPC .............. *B32B 7/027* (2019.01); *B32B 7/12* (2013.01); *B32B 15/046* (2013.01); *B32B 15/095* (2013.01); *B32B 15/18* (2013.01); *B32B 2250/04* (2013.01); *B32B 2266/0278* (2013.01); *B32B 2307/304* (2013.01); *B32B 2307/732* (2013.01)

(58) Field of Classification Search
  CPC ... B29C 44/148; B29C 44/328; B29C 44/334; B29C 44/381; B29C 44/06; B29C 44/18
  See application file for complete search history.

(56) References Cited

U.S. PATENT DOCUMENTS

| | | | |
|---|---|---|---|
| 6,860,082 | B1 | 3/2005 | Yamamoto et al. |
| 7,140,508 | B2 | 11/2006 | Kuhn et al. |
| 2009/0071088 | A1* | 3/2009 | Viegas ................ B62D 33/048 220/592.2 |
| 2014/0367393 | A1 | 12/2014 | Ranade |
| 2015/0045510 | A1* | 2/2015 | Braendli ................ C09J 175/04 525/111 |

FOREIGN PATENT DOCUMENTS

| | | |
|---|---|---|
| CN | 109900036 | 6/2019 |
| DE | 102011077366 | 12/2012 |

OTHER PUBLICATIONS

Search Report for Chinese Patent Application No. 202011148532.1, The State Intellectual Property Office of People's Republic of China, and translation.

* cited by examiner

CLIMATE CHAMBER WITH THERMALLY INSULATING SANDWICH-STRUCTURED LAMINATE

CROSS-REFERENCE TO RELATED APPLICATIONS

This application is a divisional of U.S. patent application Ser. No. 17/078,995, filed Oct. 23, 2020, which claims priority to German Patent Application No. 10 2019 128 829.0, filed Oct. 25, 2019, both of which are incorporated by reference in their entireties.

BACKGROUND

The present application relates to a method for the development of a thermally insulating sandwich-structured laminate, in particular a sandwich-structured laminate of a housing of a climate chamber, for the high-temperature range as well as a climate chamber for the high-temperature range.

SUMMARY

Climate chambers in various implementations are known in prior art and are utilized in scientific laboratories or in industrial employment for the simulation of biological, chemical and/or physical environmental conditions, such as, for example, temperature, atmospheric pressure and/or humidity. A climate chamber comprises an interior volume and a housing, wherein the interior volume is disposed within the housing and the biological, chemical and/or physical environmental conditions are simulated in the interior volume. Climate chambers, in particular constant-climate chambers for high-temperature ranges, are utilized for the simulation of temperatures from −10° C. up to 350° C.

Prior art discloses a multiplicity of methods for developing a thermally insulating sandwich-structured laminate. The thermally insulating sandwich-structured laminates produced using these known methods can be applied for the formation of a thermally insulating housing of a climate chamber, wherein the housing comprises an internal wall facing the interior volume and an external wall. For the production of a structurally stable sandwich-structured laminate a conventional 2-component PUR foam is introduced into a hollow volume developed between the internal wall and the external wall, which, at adequate dosing, completely fills the available hollow volume. The foam is cured and thereafter connects the internal wall and the external wall. Due to this connection between internal and external walls a robust sandwich-structured laminate is formed which, based on the physical properties, in particular of the cured PUR foam, has good thermally insulating properties and hence very low thermal conductivity.

As a disadvantage of this prior art should be cited that conventional two-component PUR foams have low thermal stability whereby such sandwich-structured laminates have a maximal employment range of up to 120° C. (393 K) and consequently are not suitable for use in constant climate chambers having a temperature range of more than 120° C., preferably having a temperature range of up to 350° C.

The present application proposes remedies for the above drawbacks.

The present application addresses the problem of proposing an improved method for the generation of a sandwich-structured laminate, in particular of a sandwich-structured laminate of a housing of a climate chamber, which improves the heretofore known methods in useful manner and provides a novel method that permits providing a highly structurally stable sandwich-structured laminate that has low thermal conductivity. The method is, moreover, to permit production of the sandwich-structured laminate at minimum expenditure.

These problems are resolved through the methods, sandwich-structured laminates and climate chambers disclosed herein.

The method of one embodiment for the development of a thermally insulating sandwich-structured laminate, in particular of a sandwich-structured laminate of a housing of a climate chamber for the high-temperature range, with an internal wall and an external wall, comprises the following method steps:

a. providing the internal wall,
b. adhering at least one high temperature stable insulation panel onto the internal wall,
c. positioning the external wall with respect to the internal wall such that between the internal wall and the external wall are developed the at least one temperature stable insulation panel and a hollow volume, and
d. filling the hollow volume with a PUR foam for the formation of a second foam layer connecting the at least one temperature stable insulation panel and the external wall.

In the following, here and within the context of the teaching according to the disclosure, by high temperature is understood a temperature that acts onto the utilized materials over a relatively long time period or also permanently. In the context of this application such a temperature is at least 120° C. The high temperature in the context of this application is furthermore preferably at least 180° C., 250° C. or even up to 350° C.

Moreover, here and in the following is understood by internal wall that wall, that layer or that side of a housing which at its intended application is directly thermally loaded due to the high temperature, and by external wall is understood that wall, that layer or that side of the housing which communicates with the environment whereby heat can be output to the environment by the external wall to the environment, inter alia through free convection.

The application is based on the concept that the sandwich-structured laminate comprises the internal wall and the external wall as well as at least two further layers, namely the first rigid foam layer, comprised of the temperature stable insulation panel, and the second rigid foam layer comprised of cured PUR foam. The at least one (high) temperature stable insulation panel withstands, on the one hand, high permanent thermal loading and, on the other hand, the (high) temperature stable insulation panel lowers the temperature down to the second rigid foam layer formed by the PUR foam so that it is not thermally degraded or decomposed. The PUR layer can be developed simply by filling [the hollow volume] with foam and forms a robust connection between the high temperature stable insulation panel and the external wall. The first as well as also the second rigid foam layer have a low thermal conductivity λ of approximately 0.02-0.03 W/mK whereby thermal decoupling of the internal wall and the external wall can take place.

According to the disclosure it is of advantage when carrying out the method for the adhesion of the at least one (high) temperature stable insulation panel to take place by means of a two-component adhesive, 2K adhesive for short, which is applied onto the internal wall before the at least one high temperature stable insulation panel is placed onto the internal wall. The at least one temperature stable insulation panel is typically developed from a rigid foam having pores such that resource-saving application of the adhesive on the side of the internal wall is realizable.

According to a preferred further development of the method, the at least one (high) temperature stable insulation panel of a rigid foam, in particular of a rigid polyisocyanurate foam (rigid PIR foam) with a temperature stability of more than 180° C. is formed by cutting it from a cured and foamed foam block. Polyisocyanurates have an especially high temperature stability of up to 400° C. without thermal decomposition occurring. Rigid polyisocyanurate foam has a low thermal conductivity $\lambda$ of approximately 0.02-0.03 W/mK. Low thermal conductivity or high thermal resistivity leads to a temperature decrease in the insulation panel so that in the second rigid foam layer a temperature level obtains that is sustainable for conventional PUR foams at which no thermal decomposition occurs.

It has been found to be of advantage that, when carrying out the method, several high temperature stable insulation panels are adhered adjacently onto the internal wall by jointing. The interstitial joints are preferably sealed on the side facing away from the internal wall using a temperature stable adhesive or a temperature stable adhesive tape. The temperature stable insulation panels can be adjacently disposed, for example, such that they form an angle across an edge by means of an interstitial joint whereby, due to the sealing of the interstitial joints, penetration of the PUR foam is prevented when filling in the foam.

The filling the hollow volume preferably takes place using a 2K PUR foam which, in comparison to a 1K PUR foam, has greater strength and cures more rapidly and more uniformly.

According to a further development of the method, the internal wall and/or the external wall can be produced of a special or high quality stainless steel. It has been found, in particular, that a special steel has been useful as the material of choice for the internal wall since it has a thermally, chemically and mechanically stable surface and enables the development of a resistant adhesive connection between the internal wall and the temperature stable insulation panel.

When positioning the external wall with respect to the internal wall, the distance between the external wall and the temperature stable insulation panel, disposed on the internal wall, should not be less than 15 mm, preferably more than 20 mm, and no more than 300 mm. This distance for the formation of the hollow volume is necessary in order for the hollow volume to be completely filled out when filling the hollow volume with the PUR foam in liquid phase and can completely connect the external wall over its entire area with the temperature stable insulation panel to form the structurally stable sandwich-structured laminate.

A further aspect relates to a sandwich-structured laminate comprising an internal wall and an external wall and at least two rigid foam layers between them, wherein the first rigid foam layer is comprised of at least one temperature stable insulation panel, preferably of PIR, and the second rigid foam layer is comprised of a cured PUR foam.

A third aspect relates to a climate chamber for the high temperature range, comprising at least one housing including a door, with an interior volume which is closable by the at least one door. The embodiments provide that the housing is formed of a sandwich-structured laminate that comprises an internal wall facing the interior volume and an external wall, wherein on the side of the internal wall facing away from the interior volume at least one high temperature stable insulation panel is secured by means of an adhesive layer and wherein the high temperature stable insulation panel is connected under material closure with the external wall through a second rigid foam layer of foamed PUR foam. Due to the sandwich-structured laminate of the housing, on the one hand, high structural stability of the housing can be attained and, on the other hand, a highly effective thermal insulation of the interior volume can be provided which enables the best possible thermal decoupling of the interior volume.

According to an advantageous implementation, the adhesive layer is formed of a temperature stable 2K adhesive. The 2K adhesive can preferably be an epoxy, polyurethane or similar adhesive that has high strength and stability and simultaneously cures uniformly and rapidly.

It has furthermore been found to be advantageous for the high temperature stable insulation panel to be formed of a fully cured rigid foam, especially a polyisocyanurate (PIR), having a temperature stability of more than 180° C., preferably up to 400° C. Especially polyisocyanurates have a low thermal conductivity $\lambda$ of approximately 0.02 to 0.03 W/mK, whereby, due to the resulting thermal resistivity, a temperature decrease to a temperature level T of T≤120° C. takes place that is relatively sustainable for the second rigid foam layer of a PUR foam.

It is additionally preferred if between two adjacent temperature stable insulation panels an interstitial joint is disposed. When disposing the high temperature stable insulation panels on the internal wall, an interstitial joint is formed between two insulation panels placed edge to edge as well as also between insulation panels disposed across edges. This interstitial joint is preferably at least partially filled with a temperature stable adhesive from the side facing the external wall, or the side facing the external wall is sealed using a temperature stable adhesive tape. Filling or sealing the interstitial joint prevents the PUR foam from penetrating into the interstitial joint when filling the foam into the hollow volume, which [foam] is thermally decomposed during future use of the climate chamber and can subsequently lead to the formation of heat bridges.

The second rigid foam layer is preferably formed by filling in and curing a 2K PUR foam. 2K PUR foams have high strength and form a temperature stable connection. The 2K PUR foam, moreover, cures rapidly and uniformly.

It can furthermore be preferable for the internal wall and/or the external wall to be built of special steel. It is in particular preferred for the internal wall to be built of a special steel since this material is thermally and chemically stable as well as also mechanically structurally stable.

It was also found to be advantageous for the foamed PUR foam layer to have a layer thickness of at least 15 mm, preferably more than 20 mm, and not more than 300 mm. A layer thickness of approximately 20 mm ensures that, when filling the hollow volume between the temperature stable insulation panel and the external wall, the PUR foam in liquid phase flows completely through the hollow volume before curing of the PUR foam takes place.

BRIEF DESCRIPTION OF THE DRAWINGS

In the following an embodiment example of a climate chamber comprising a housing formed of a sandwich-structured laminate will be explained in detail with reference to the accompanying drawing. The Figures depict.

DETAILED DESCRIPTION

Figure 1:
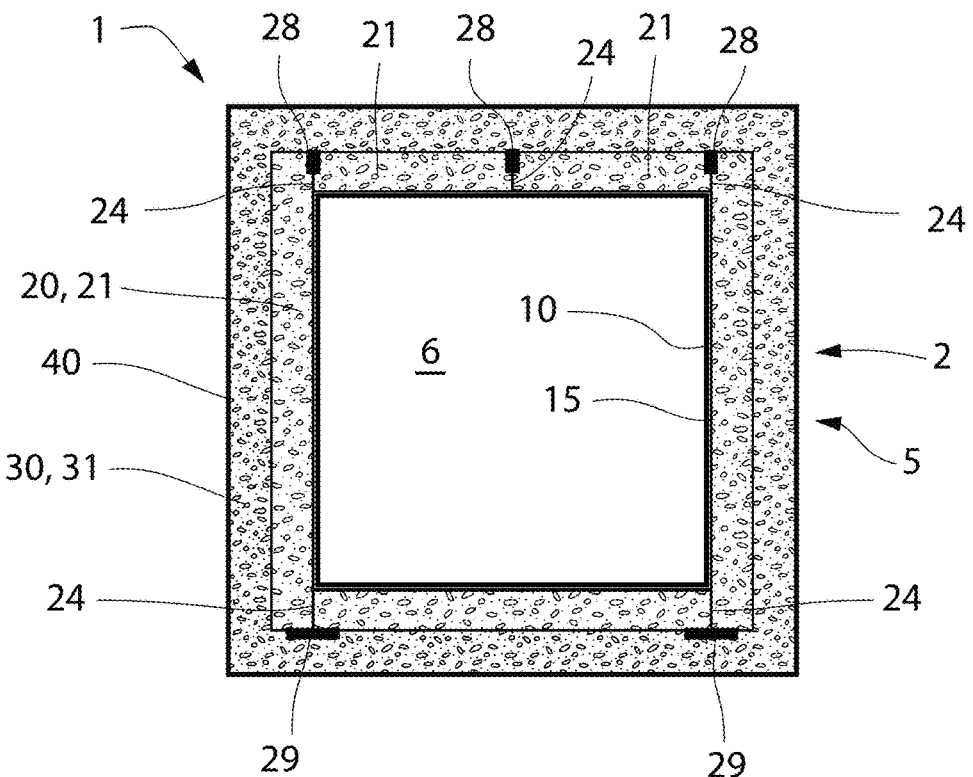
FIG. 1 a highly simplified sectional representation through a housing of a climate chamber, and FIG. 2 a highly simplified block diagram of a production method of a sandwich-structured laminate for the housing of the climate chamber.

FIG. 1 shows a highly simplified sectional representation of a climate chamber 1 with a housing 5 whose walls are formed of a sandwich-structured laminate 2. The housing comprises at least one (not depicted) door through which an interior volume 6, encompassed by the housing 5, is accessible.

The climate chamber 1 can be a constant climate chamber in the high temperature range that is developed for setting in the interior volume 6 a temperature in the range from −10° C. to 350° C., or approximately 263 K to approximately 623 K, for long-term operation.

The housing 5 is formed of the sandwich-structured laminate 2 and comprises an internal wall 10 facing the interior volume 6, an adhesive layer 15, a first (high) temperature stable rigid foam layer 20, a second rigid foam layer 30 and an external wall 40.

The high temperature stable first rigid foam layer 20 is produced of a rigid foam with a temperature stability of above 300° C., preferably up to 400° C. The first rigid foam layer 20 can be developed from a rigid PIR foam (rigid polyisocyanurate foam). The rigid PIR foam can first be foamed in blocks and subsequently, by slicing, sawing, milling or similar methods, high temperature stable insulation panels 21 can be cut therefrom which form the first rigid foam layer 20.

The second rigid foam layer 30 has a lower temperature stability than the first rigid foam layer 20 of up to 120° C. and is formed from a PUR foam (polyurethane foam).

The internal wall 10 can be produced of special steel and is connected with the first rigid foam layer 20 by means of an adhesive layer 15. The second rigid foam layer 30 connects the first rigid foam layer 20 with the external wall 40.

The thickness of the first rigid foam layer 20 and that of the second rigid foam layer 30 are to be selected such that across the thickness of the first rigid foam layer 20 a temperature decrease toward the second rigid foam layer 30 takes place that is of such magnitude that the temperature level on the side, facing the interior volume 6, of the second rigid foam layer 30 is less than the temperature stability of the utilized cured PUR foam 31.

Since the material utilized for the first rigid foam layer 20 as well as also that utilized for the second rigid foam layer 30 have each a thermal conductivity λ of approximately 0.02 to 0.03 W/mK, the thickness of the first rigid foam layer 20 should be selected to be at least twice that of the second rigid foam layer 30.

Figure 2:
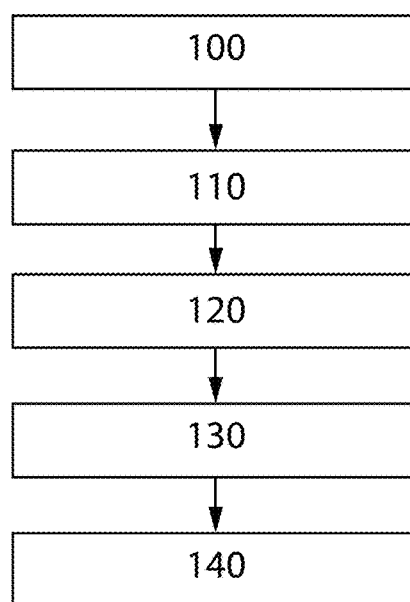

FIG. 2 shows a schematic flow chart of a method for developing the thermally insulating sandwich-structured laminate 2, wherein, first, the internal wall 10 is provided in a method step 100.

The internal wall 10 can be produced of special steel and be developed in the form of a cuboid to develop the interior volume 6.

After providing the internal wall, one or more high temperature stable insulation panels 21 of a rigid PIR foam (rigid polyisocyanurate foam) can be provided, for example, by cutting off or trimming a panel from a previously foamed block. To connect the at least one high temperature stable insulation panel 21 with the internal wall 10, in a method step 110, first, an adhesive layer 15 is applied over the surface area of the internal wall 10. The adhesive layer 15 is produced of a high temperature stable adhesive which can be, for example, a 2K adhesive that is distinguished by high strength and stability and rapid and homogeneous curing.

Subsequently, in a next method step 120, for the purpose of adhering, the temperature stable insulation panels 21 are placed edge to edge onto an adhesive layer 15 on the internal wall 10 and specifically such that approximately the entire internal wall 20 is covered.

With reference to FIG. 1 it is evident that at the edges of the internal wall 10, which in cross section have the form of cuboids, between adjacent insulation panels 21 small interstitial joints 24 or gaps are disposed which in a (not depicted) method step can be sealed through the complete or partial application or filling by means of a high temperature stable adhesive 28 onto the side facing away from the internal wall 10. In FIG. 1 on an upper side of the internal wall [10] two insulation panels 21 are disposed, wherein the interstitial joints 24 are sealed at adjacent side edges using adhesive 28. As shown in an underside in FIG. 1, alternatively, a high temperature stable adhesive tape 29 can seal off the side of the interstitial joint 24 facing away from the internal wall 10.

In a subsequent method step 130, the previously implemented unit of internal wall 10, adhesive layer 15 and high temperature stable insulation panel 21 is positioned on an external wall 40, previously provided and preferably also cuboid in shape, and specifically such that between the high temperature stable insulation panels 21 and the external wall 40 a hollow volume is developed with as uniform a distance between the insulation panels 21 and the external wall 40 as possible.

In order to connect the external wall 40 with the previously implemented unit, in a method step 140 into the hollow volume a PUR foam is introduced or the hollow volume is filled with the PUR foam. In order for the PUR foam to completely wet the previously implemented unit, the hollow volume, or the second rigid foam layer 30 to be formed now, should have a thickness of approximately 20 mm. The PUR foam is preferably a 2K foam which in liquid phase flows as best as possible completely through the hollow volume and subsequently cures rapidly and uniformly into the second rigid foam layer 30 that connects the external wall 40 with the unit and forms the sandwich-structured laminate 2.

LIST OF REFERENCE NUMBERS

1 Climate chamber
2 Sandwich-structured laminate
5 Housing
6 Interior volume
10 Internal wall
15 Adhesive layer
20 First rigid foam layer
21 Insulation panel
24 Interstitial joint
28 Adhesive
29 Adhesive tape
30 Second rigid foam layer
31 PUR foam
40 External wall
100 Method step
110 Method step
120 Method step
130 Method step
140 Method step

The invention claimed is:

1. A high temperature range climate chamber, comprising:
a housing having a closeable interior volume, wherein the housing is formed of a sandwich-structured laminate, wherein the sandwich-structured laminate comprises:
an internal wall facing the interior volume;
an external wall;
a high temperature stable insulation panel of a first rigid foam layer, wherein the high temperature stable insulation panel is located on a side of the internal wall facing away from the interior volume;
an adhesive layer that connects the high temperature stable insulation panel to the internal wall;
a second rigid foam layer of PUR foam;
an interstitial joint disposed between two adjacent high temperature stable insulation panels, wherein the interstitial joint is at least partially filled with a temperature stable adhesive or is sealed, on a side facing the external wall, with a temperature stable adhesive tape;
wherein the high temperature stable insulation panel is connected with the external wall by the second rigid foam layer;
wherein the climate chamber maintains the interior volume at a high temperature range between 120° C. and 350° C.

2. The climate chamber as in claim 1, wherein the adhesive layer is formed of a temperature stable 2K adhesive.

3. The climate chamber as in claim 1, wherein the high temperature stable insulation panel is formed of a fully cured rigid foam, with a temperature stability of more than 120° C.

4. The climate chamber as in claim 1, wherein the first rigid foam layer, the second rigid foam layer, or both the first and second rigid foam layers, are polyisocyanurate (PIR).

5. The climate chamber as in claim 1, wherein the internal wall and/or the external wall is steel or formed of steel.

6. The climate chamber as in claim 1, wherein the second rigid foam layer has a layer thickness of at least 20 mm and not more than 300 mm.

7. The climate chamber as in claim 4, wherein the high temperature stable insulation panel is connected with the external wall by a 2K PUR foam.

8. A high temperature range climate chamber, comprising:
a housing having a closeable interior volume, wherein the housing is formed of a sandwich-structured laminate, wherein the sandwich-structured laminate comprises:
an internal wall facing the interior volume;
an external wall;
a high temperature stable insulation panel of a first rigid foam layer, wherein the high temperature stable insulation panel is located on a side of the internal wall facing away from the interior volume;
an adhesive layer that connects the high temperature stable insulation panel to the internal wall;
a second rigid foam layer of PUR foam;
wherein the high temperature stable insulation panel is connected with the external wall by the second rigid foam layer; and
wherein the climate chamber maintains the interior volume at a high temperature range between 120° C. and 350° C.

* * * * *